US012663014B1

(12) United States Patent
Urac

(10) Patent No.: US 12,663,014 B1
(45) Date of Patent: Jun. 23, 2026

(54) BI-METAL IMPELLER ROTOR

(71) Applicant: PRATT & WHITNEY CANADA CORP., Longueuil (CA)

(72) Inventor: Tibor Urac, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/250,227

(22) Filed: Jun. 26, 2025

(51) Int. Cl.
| | |
|---|---|
| *B23K 20/12* | (2006.01) |
| *F04D 29/02* | (2006.01) |
| *F04D 29/28* | (2006.01) |
| *B23K 103/14* | (2006.01) |

(52) U.S. Cl.
CPC .......... *F04D 29/023* (2013.01); *B23K 20/129* (2013.01); *F04D 29/284* (2013.01); *B23K 2103/14* (2018.08)

(58) Field of Classification Search
CPC ... F04D 29/023; F04D 29/284; B23K 20/129; B23K 2103/14; B23P 15/006; F01D 5/021; F01D 529/023
See application file for complete search history.

(56) References Cited

U.S. PATENT DOCUMENTS

| | | | |
|---|---|---|---|
| 4,273,512 A | 6/1981 | Weiler |
| 4,787,821 A | 11/1988 | Cruse |
| 6,499,953 B1 | 12/2002 | Bellerose |
| 6,935,840 B2 | 8/2005 | Romani |
| 7,841,506 B2 | 11/2010 | Hall et al. |
| 8,137,075 B2 | 3/2012 | Howe et al. |
| 8,187,724 B2 | 5/2012 | Rice |
| 11,898,462 B2 | 2/2024 | Abrari |
| 12,215,595 B1 | 2/2025 | Smallwood et al. |
| 2008/0124210 A1 | 5/2008 | Wayte |
| 2011/0142653 A1 | 6/2011 | Hagshenas et al. |
| 2013/0004316 A1 | 1/2013 | Matwey |
| 2023/0127604 A1* | 4/2023 | Abrari ................... F04D 29/284 |
| | | | 60/805 |

FOREIGN PATENT DOCUMENTS

| | | | |
|---|---|---|---|
| CN | 103967837 B | 1/2017 | |
| DE | 102011000544 A1 * | 8/2012 | ........... B23K 33/006 |
| KR | 20130116677 A | 10/2013 | |

OTHER PUBLICATIONS

English translation of DE-102011000544-A1 (Year: 2012).*
Zhang, Zebang; Balint, Daniel; Dunne, Fionn; "Dwell fatigue in two Ti alloys: An integrated crystal plasticity and discrete dislocation study", Aug. 12, 2016, Journal of Mechanics and Physics of Solids, vol. 96, pp. 411-427 (Year: 2016).

* cited by examiner

*Primary Examiner* — Jun S Yoo

(74) *Attorney, Agent, or Firm* — NORTON ROSE FULBRIGHT CANADA LLP

(57) ABSTRACT

A method of manufacturing an impeller for a compressor section of a gas turbine engine, comprises forging a dual alloy workpiece having an inner portion welded to an outer portion along a conical weld line. The forging includes deforming the conical weld line to provide a non-linear interface between the inner portion and the outer portion.

13 Claims, 6 Drawing Sheets

1

BI-METAL IMPELLER ROTOR

TECHNICAL FIELD

The disclosure relates generally to aircraft engines and, more particularly, to a dual alloy impeller and a method to manufacture the same.

BACKGROUND OF THE ART

Impellers of aircraft engines are subjected to different temperatures and mechanical stresses at different impeller locations. This may limit the choice of materials used to manufacture them. Cold portions, such as the central bore region of the impeller may be prone to cold dwell, whereas hot portions, such as the radially outer back face region of the impeller, may be prone to creep. Materials that are resistant to cold dwell may not be well suited to withstand hot temperatures and vice versa. Improvements are thus sought.

SUMMARY

In one aspect, there is provided a method of manufacturing a dual alloy impeller for a compressor section of an aircraft engine, the method comprising: obtaining a first workpiece of a first metal alloy; obtaining a second workpiece of a second metal alloy, the second workpiece defining a cavity for receiving the first workpiece in a complementary fashion, the second metal alloy being more creep resistant than the first metal alloy, the first metal alloy being more cold dwell resistant than the second metal alloy; inserting the first workpiece into the cavity of the second workpiece and joining the first workpiece to the second workpiece to create a pre-joined dual alloy workpiece; and then forging the pre-joined dual alloy workpiece.

According to another aspect, there is provided a method of manufacturing an impeller for a compressor section of a gas turbine engine, the method comprising: forging a dual alloy workpiece having an inner portion welded to an outer portion along a conical weld line, the forging including deforming the conical weld line to provide a non-linear interface between the inner portion and the outer portion.

Any single one or any combination of the following features may be used with any one of the methods above. Forging the pre-joined dual alloy workpiece may comprise creating a non-linear interface between the first metal alloy and the second metal alloy. Creating the non-linear interface may comprise creating a curved interface between the first metal alloy and the second metal alloy. In some aspects, the curved interface may gradually curve radially away from a central axis of the dual alloy impeller in an aft direction towards a back face of the dual alloy impeller. Forging the pre-joined dual alloy workpiece may comprise using flow maps from forge modelling to create a non-linear interface between the first metal alloy and the second metal alloy. Creating the non-linear interface may comprise deforming a weld line between the first metal alloy and the second metal alloy. Joining the first workpiece to the second workpiece may comprise friction welding the first workpiece to the second workpiece to form a weld joint therebetween, and forging the pre-joined dual alloy workpiece may comprise deforming the weld joint to create a non-linear interface between the first metal alloy and the second metal alloy. The weld joint may be formed between a radially outer surface of the first workpiece and a radially inner surface of the second workpiece. The forging may comprise forging a friction weld joint between the first metal alloy and the second metal alloy. In some aspect, the method may comprise changing a metal grain direction of the first metal alloy and the second metal alloy at the friction weld joint.

In accordance with another general aspect, there is provided an impeller for a compressor section of an aircraft engine, comprising: a monolithic forging having a hub portion made of a first metal alloy and a bladed disk portion surrounding the hub portion and made of a second metal alloy, the hub portion joined to the bladed disk portion along a friction weld line, a grain structure of the first metal alloy and the second metal alloy at the friction weld line forming a non-linear metal grain flow.

Any single one or any combination of the following features may be used with the examples above. The first metal alloy may be more cold dwell resistant than the second metal alloy, and the second metal alloy may be more creep resistant than the first metal alloy. The friction weld line between the hub portion and the bladed disk portion may be forged so as to curve radially away from a central axis of the hub portion along an aft direction from a front face to a back face of the monolithic forging. The first metal alloy and the second metal alloy may be two different titanium alloys. The bladed disk portion may include a circumferential array of blades, the circumferential array of blades entirely comprised of the second metal alloy and disposed radially outwardly from the friction weld line.

DESCRIPTION OF THE DRAWINGS

Reference is now made to the accompanying figures in which.

DETAILED DESCRIPTION

Figure 1:
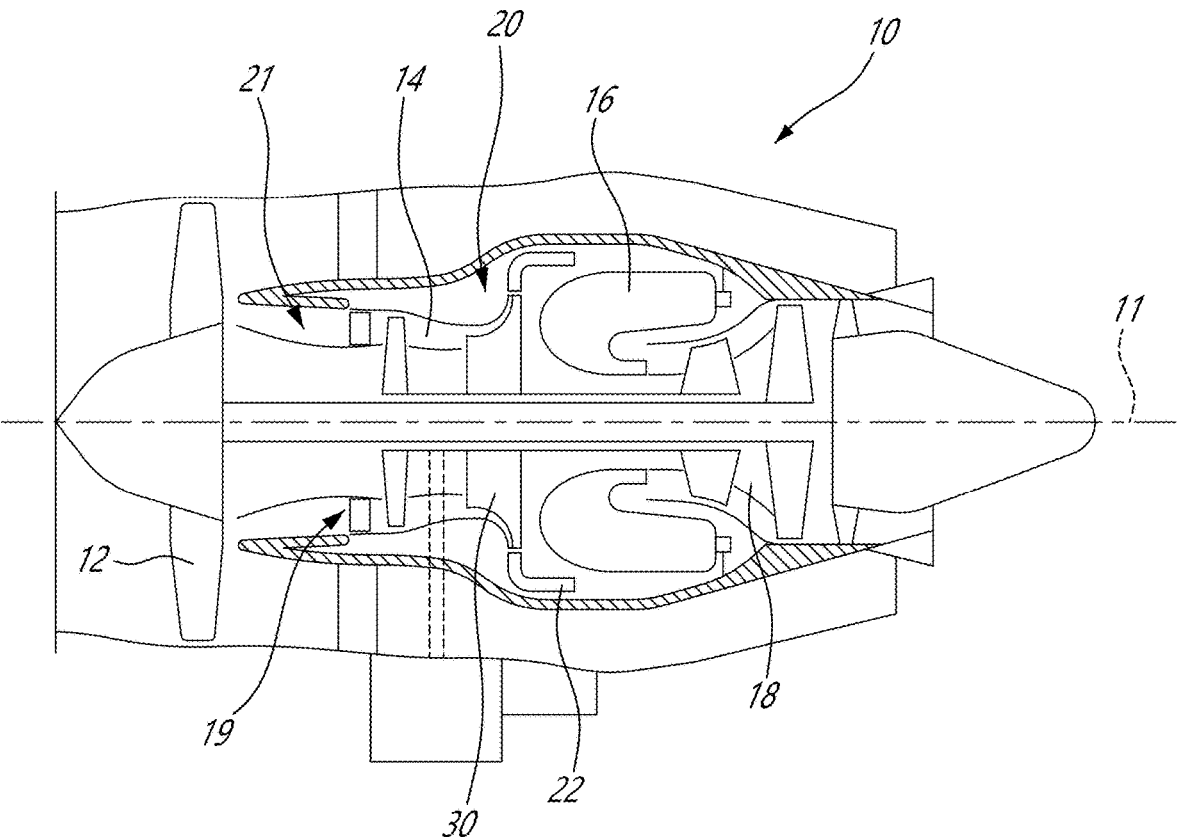
FIG. 1 is a schematic cross section view of an aircraft engine exemplified as a turbofan engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14 and the turbine section 18 rotate around a central axis 11 of the gas turbine engine 10.

The compressor section 14 includes an axial compressor 19, which may include one or more stages, each including stator vanes and rotor blades. The compressor section 14 further includes a centrifugal compressor 20 located downstream of the axial compressor 19 relative to the airstream flowing through a core flow path 21 of the gas turbine engine 10. The centrifugal compressor 20 includes an impeller 30 and a diffuser 22 located downstream of the impeller 30. The axial compressor 19 may be referred to as a low-pressure compressor, whereas the centrifugal compressor 20 may be referred to as a high-pressure compressor.

Figure 2:
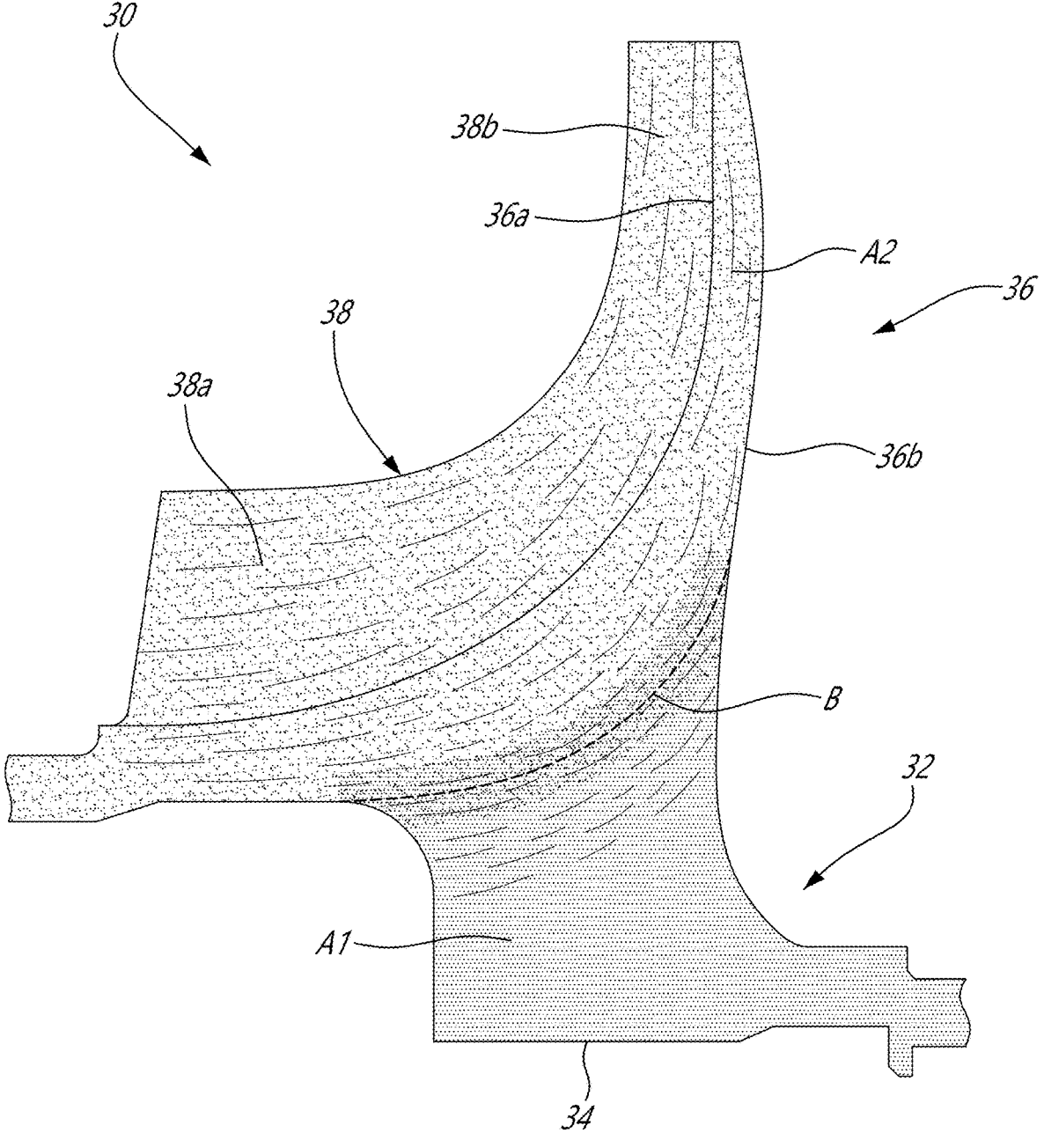
FIG. 2 is a cross-section view of a dual alloy impeller of a compressor section of the turbofan engine shown in FIG. 1.

As shown in FIG. 2, the impeller 30 comprises a hub 32 defining a central bore 34 configured to be mounted to a shaft for rotation about the central axis 11, and a disk 36 extending radially outwardly from the hub 32 and having a front face 36a and a back face 36b. A circumferential array of blades 38 extends from the front face 36a of the disk 36. The blades 38 have an inducer portion 38a with a major axial component and an exducer portion 38b curving radially outwardly from the inducer portion 38a.

In use, the impeller 30 can experience significantly different structural challenges at different impeller locations. For example, the high temperature back face 36b of the impeller 30 may drive the need for using a metal alloy known for its superior hot creep resistance properties. Such material, however, can suffer from cold dwell issues at the bore 34, which sees high stresses at lower temperatures during takeoff due to its large thermal inertia. As gas path temperatures increase, the demand for high temperature creep resistance properties and high cold dwell resistant properties in different regions of the impeller become increasingly difficult to reconcile and challenge the metallurgist for a creative solution.

In the context of the present disclosure, "creep" corresponds to a tendency of a solid material to move slowly or deform permanently under the influence of persistent mechanical stresses. It may occur as a result of long-term exposure to high levels of stress that are still below the yield strength of the material. Creep may be more severe in materials that are subjected to heat for long periods and generally increases as they operate near their melting point. The rate of deformation is a function of the material's properties, exposure time, exposure temperature and the applied structural load. Depending on the magnitude of the applied stress and its duration, the deformation may become so large that a component can no longer perform its function. Creep is usually of concern when evaluating components that operate under high stresses and/or high temperatures. Unlike brittle fracture, creep deformation does not occur suddenly upon the application of stress. Instead, strain accumulates as a result of long-term stress. Therefore, creep is a "time-dependent" deformation.

Still in the context of the present disclosure, "cold dwell" refers to the reduction in the fatigue life-time of a component as a result of exposing the component to a constant high mean stress during cruising, between the ramping up of the load, during take-off for instance, and the ramping down of the load, on landing for instance. The "cold" of cold dwell fatigue refers to the fact that this phenomenon may happen at temperatures of around 100 degrees Celsius or less, in a relatively cold part of the engine. Cold dwell fatigue remains an unsolved engineering problem. Its complexity raises a host of fundamental questions about plasticity, creep and fracture in metals, such as titanium and its alloys. Many metallurgical factors may affect cold dwell fatigue: alloy composition: the most susceptible Ti alloys are those containing high volume fractions of the alpha (HCP) phase and low volume fractions of the beta (BCC) phase); microstructure: the most susceptible alloys contain clusters of alpha grains that have small misorientations between them (microtexture); duration of the dwell and the loading during the dwell; creep; fracture morphology: the crack initiates below the surface of the specimen and consists of facets almost parallel to the basal plane of the alpha phase.

A dual alloy approach is one that may allow the bore and outer disk composition and microstructure to be tailored to meet the design requirements. However, the ability of positioning the different materials exactly where they are needed is challenging. Moreover, the interface between the different alloys may represent a zone of weakness in the finished impeller product. As will be seen hereafter, according to some embodiments, these challenges may be addressed by welding two workpieces comprised of different metal alloys and then forging the two pre-joined workpieces together in a die to reorganize the metal grain structure of the pre-joined workpieces, including the grain flow at the weld interface to obtain a forged enhanced weld line.

FIG. 2 illustrates an example of a dual alloy impeller provided in the form of a monolithic forging including a hub portion comprised of a first metal alloy A1, and a bladed disk portion comprised of a second metal alloy A2. The first metal alloy A1 is selected for its cold dwell resistance and high strength properties, whereas the second metal alloy A2 is selected for its high temperature creep resistance properties. For example, Titanium IMI834 can be used as the first metal alloy A1 and Titanium CPW459 can be used as the second metal alloy A2. Titanium IMI834 is more high temperature creep resistant than Titanium CPW459, which is more cold dwell resistant than Titanium IMI834. As can be appreciated from FIG. 2, the interface or boundary B between the two different metal alloys A1, A2 can be non-linear so as to extend in areas suitable for both materials. As will be seen hereinafter, this can be achieved by frictional welding the two different metal alloy parts together and then forging the pre-welded parts so as to reshape the weld line to extend in the desired locations of the impeller.

Figure 3A:
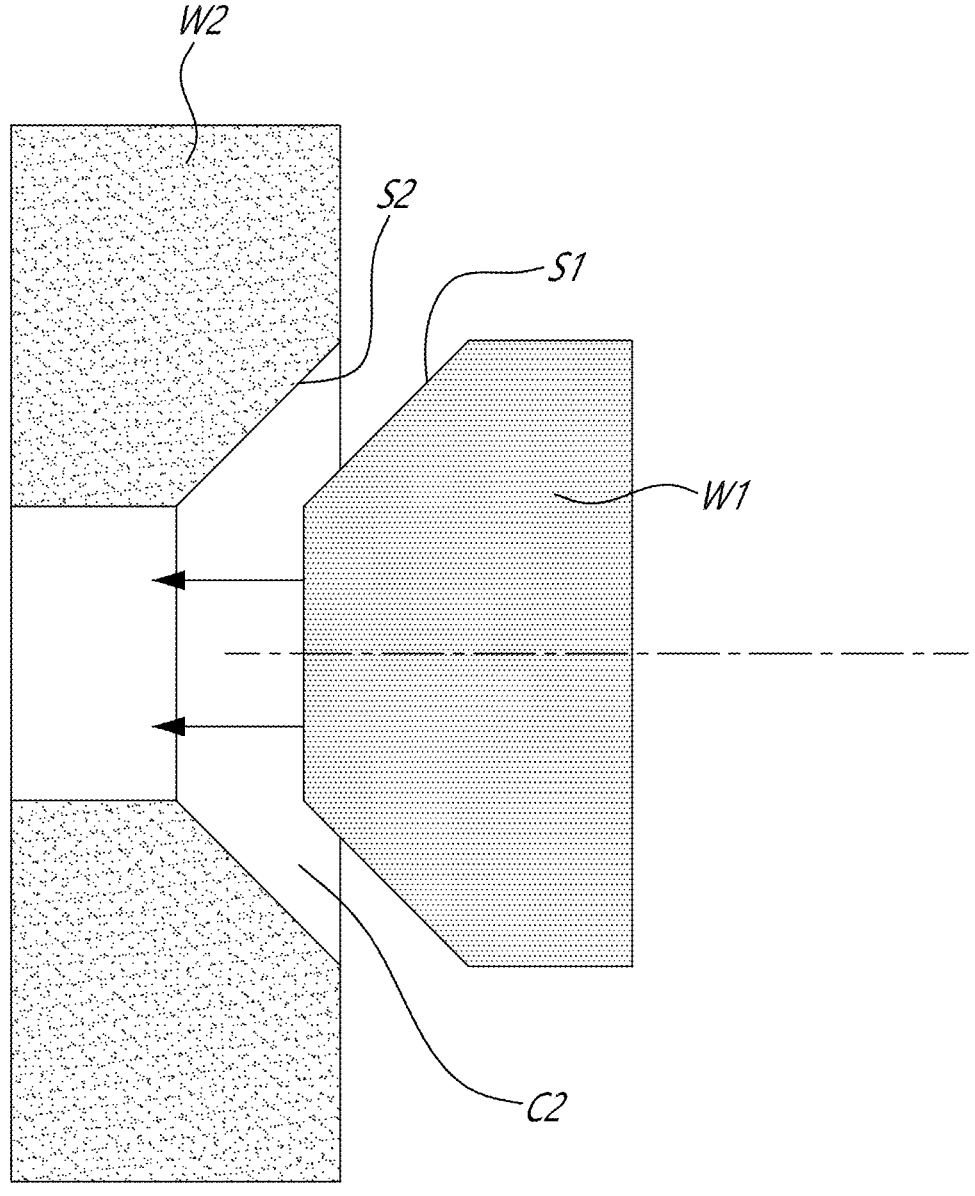
FIGS. 3*a*-3*d* illustrate a process for manufacturing a dual alloy impeller from two raw metal alloy workpieces friction welded to one another to form a pre-joined dual alloy workpiece that is then forged to provide an impeller forging having a non-linear interface between the two metal alloys composing the impeller.
Figure 3B:
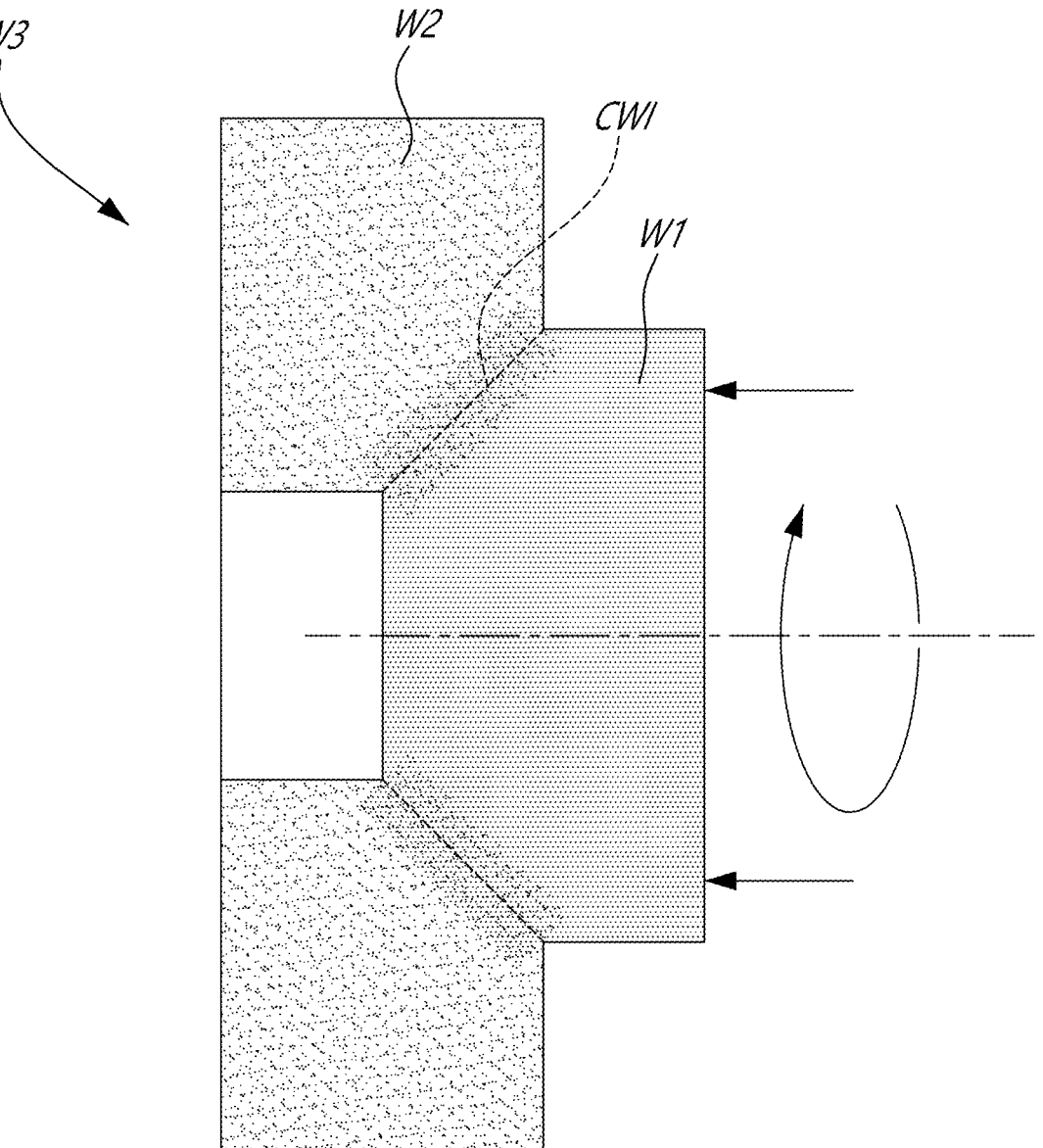

Now turning to FIGS. 3A-3D, a method for manufacturing such a dual alloy impeller with a forged enhanced friction weld will be described. According to some embodiments and as shown in FIG. 3A, the method comprises obtaining a first workpiece W1 from a first metal alloy (e.g., CPW459) and a second workpiece W2 from a second metal alloy (e.g., IMI834). The first and second workpieces W1, W2 can be provided in the form of starting stocks, such as raw billets or raw ingots. The first and second workpieces W1, W2 are formed to have complementary mating surfaces. According to the illustrated example, the second workpiece W2 has a conical cavity C2 bounded by a radially inner surface S2 configured for mating engagement with a radially outer conical surface S1 of the first workpiece W1. Still according to some embodiments and as shown in FIG. 3B, the first workpiece W1 may be friction welded to the second workpiece W2 to create a pre-joined dual alloy workpiece W3. To obtain the pre-joined dual workpiece W3, the first workpiece W1 may be axially inserted in the cavity C2 of the second workpiece W2 to bring the radially outer and radially inner surfaces S1, S2 in mating engagement, and one of the first and second workpieces W1, W2 may be held stationary while the other is rapidly rotated around its central axis. The momentum of the rotating workpiece creates relative motion. The rotating workpiece is pushed by specific pressure, and then during the friction, the position of the rotating workpiece is kept constant. As the rotating workpiece rubs against the stationary workpiece, the friction generates heat, which softens the material at the conical interface. By applying an external force, the workpieces W1, W2 deform plastically, making joining the two different metal alloys possible without melting them. As shown in FIG. 3B, the resulting pre-joined dual alloy workpiece W3 has a conical weld interface CWI. According to some embodiments, the conical weld interface CWI is enhanced by forging the two alloy materials in a same die structure.

Figure 3C:
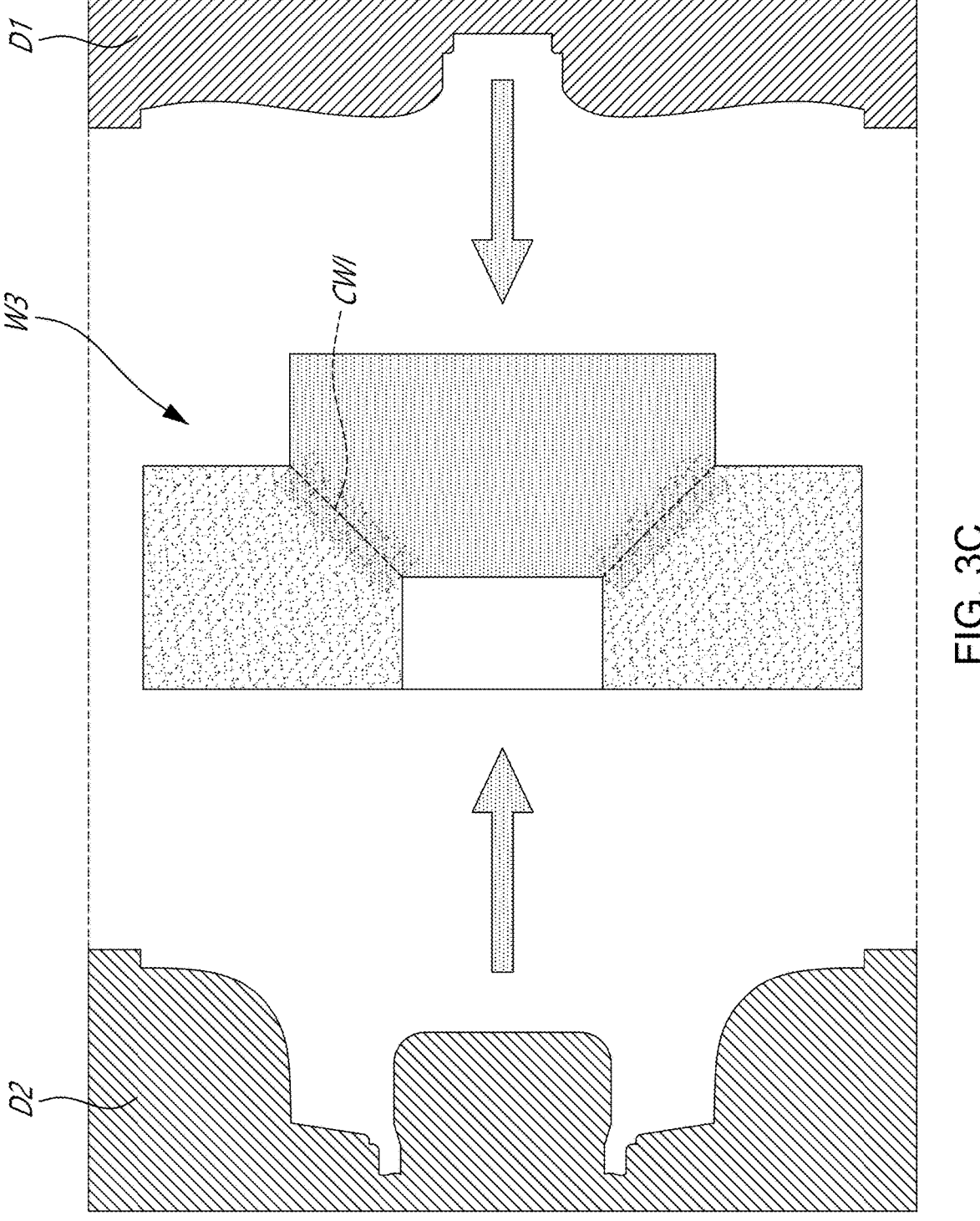
Figure 3D:
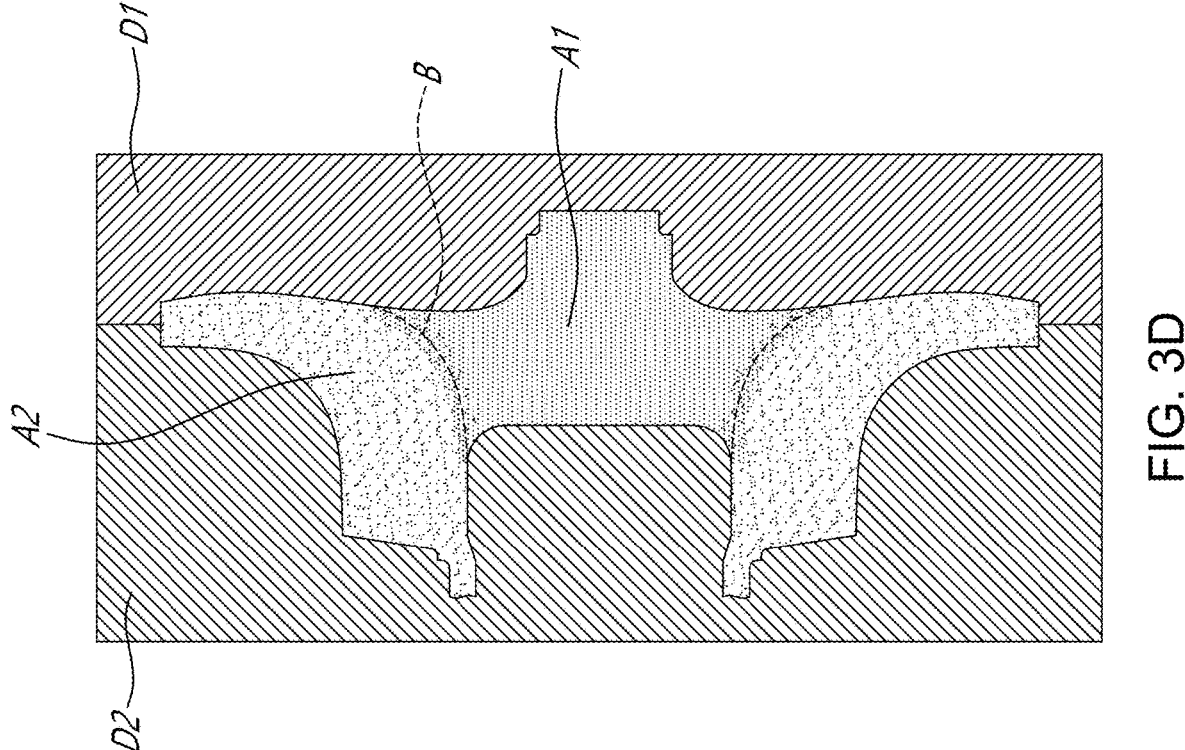

Indeed, as shown in FIGS. 3C-3D, the pre-joined dual alloy workpiece W3 is placed in a die structure D1, D2 and squeezed-formed in the desired impeller shape. According to some embodiments, forging the pre-joined dual alloy workpiece W3 comprises using flow maps from forge modelling to reshape or deform the conical weld interface CWI so as to create a non-linear interface or boundary B (FIG. 2 and FIG. 3D) between the first metal alloy A1 and the second metal alloy A2 in the final forged product. For example, forging can be used to change the metal grain direction of both metal alloys A1, A2 at the boundary B between the two metal alloys. In this way, the profile of the material interface (i.e., the boundary) may be shaped to follow more complex profiles as it would be possible if the two different metal alloy workpieces were first to be individually forged and then welded together. By welding and subsequently forging, it is possible to obtain a more complex interface profile between the two alloy materials A1, A2. This provides the ability to more precisely control the boundary of each material in the finished impeller to obtain the desired material properties where they are needed. It allows to have a more complex distribution of materials throughout the body of the impeller 30. For example, according to the example illustrated in FIG. 2, the forging can be used to create a curved interface between the first metal alloy A1 and the second metal alloy A2 (see boundary line B in FIGS. 2 and 3D). The curved interface may be configured to gradually curve radially away from the central axis of the dual alloy impeller in an aft direction towards the back face 36b of the dual alloy impeller 30. This may result in an impeller having more targeted structural properties tailored to the localized needs. After forging, the dual alloy forged impeller can be further threated (e.g., heat treatment) and machined to its final shape to obtain the dual alloy impeller 30 shown in FIG. 2. According to the illustrated embodiment, the blades 38 of the impeller 30 are entirely comprised of the second metal alloy A2 and disposed radially outwardly from the boundary B (i.e., the forged enhanced weld interface) between the two metal alloys A1, A2. However, according to other embodiments, a portion of the blades 38 (e.g., the inducer portion 38a) could be made out of the same alloy as the bore region of the impeller. Indeed, the ability of reshaping the weld line at the forging step allows various boundary configuration between the different materials.

According to one or more embodiments, a bi-metal impeller rotor is created by friction welding two raw billets made of different metal alloys prior to creating the raw forging. The resulting bi-metallic part is then forged to create a forging having a non-linear metal grain distribution between the two metal alloys composing the impeller. Flow maps from forge modelling could be used to determine the position of the friction weld in the bi-metallic billet in line with the finished part requirements. The forging of the part after the joining of the raw billets (i.e., the forging of the bi-metal billet) provides for an irregular interface between the two metal alloys, which, in turn, allows for a more complex material distribution in the finished bi-metal impeller rotor as compared to a bi-metallic impeller created from two forged parts which are then friction welded together. The forging of two pre-joined raw stocks may, thus, provide greater ability to have the material properties where you most need them.

According to still further embodiments, a bi-metal impeller rotor is manufactured by friction welding two raw stocks (e.g., raw billets) of different metal alloys and then forging the pre-assembled workpiece in a die so as to create a non-linear material distribution between the two different alloys. Indeed, by joining the two stocks at a raw material stage prior to forging, it is possible to work the grain structure of the two alloys so as to create an irregular interface between the two alloys as dictated by the work hardening of the die of the forging. By working the grain structure (i.e., forging) after the joining of the two alloys, a better dual alloy distribution can be obtained in the finished part.

It can be appreciated that at least some of the above-described embodiments provide a dual alloy approach, generally combining a higher strength bore alloy and a high temperature outer bladed disk alloy. The forging of the pre-joined bore alloy and outer bladed click alloy allows to have the material properties where they are most needed. The subsequent forging allows to having different boundary configurations and shapes between the two alloys. The integrity of the friction weld between the two alloys may be improved by forging and the location of the interface location can be better controlled.

Still according to some embodiments, the process involves friction welding an inner bore workpiece and an outer workpiece together, followed by a conjoint forging of the pre-joined workpieces. Such a sequence of steps (friction weld followed by forging) may provide improved strength performance in bore regions of the impeller while also providing improved high temperature performance in the outward radial regions of the impeller.

No element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, it is understood that the above described embodiments are not limited to impellers of turbofan engines. Indeed, similar principles could be applied to other rotor components of various types of aircraft engines and the like. Yet further modifications could be implemented by a person of ordinary skill in the art in view of the present disclosure, which modifications would be within the scope of the present technology.

The invention claimed is:

1. A method of manufacturing a dual alloy impeller for a compressor section of an aircraft engine, the method comprising:

obtaining a first workpiece of a first metal alloy;

obtaining a second workpiece of a second metal alloy, the second workpiece defining a cavity for receiving the first workpiece in a complementary fashion, the second metal alloy being more creep resistant than the first metal alloy, the first metal alloy being more cold dwell resistant than the second metal alloy;

inserting the first workpiece into the cavity of the second workpiece and joining the first workpiece to the second workpiece to create a pre-joined dual alloy workpiece; and then forging the pre-joined dual alloy workpiece, wherein the forging the pre-joined dual alloy workpiece comprises using flow maps from forge modelling to create a non-linear interface between the first metal alloy and the second metal alloy.

2. The method of claim 1, wherein the creating the non-linear interface comprises creating a curved interface between the first metal alloy and the second metal alloy.

3. The method of claim 2, wherein the curved interface gradually curves radially away from a central axis of the dual alloy impeller in an aft direction towards a back face of the dual alloy impeller.

4. The method of claim 1, wherein creating the non-linear interface comprises deforming a weld line between the first metal alloy and the second metal alloy.

5. The method of claim 1, wherein the joining the first workpiece to the second workpiece comprises friction welding the first workpiece to the second workpiece to form a weld joint therebetween, and wherein the forging the pre-joined dual alloy workpiece comprises deforming the weld joint to create the non-linear interface between the first metal alloy and the second metal alloy.

6. The method of claim 5, wherein the weld joint is formed between a radially outer surface of the first workpiece and a radially inner surface of the second workpiece.

7. The method of claim 1, wherein the forging comprises forging a friction weld joint between the first metal alloy and the second metal alloy.

8. The method of claim 7, comprising changing a metal grain direction of the first metal alloy and the second metal alloy at the friction weld joint.

9. A method of manufacturing an impeller for a compressor section of a gas turbine engine, the method comprising:

forging a dual alloy workpiece having an inner portion welded to an outer portion along a conical weld line, the forging including deforming the conical weld line to provide a non-linear interface between the inner portion and the outer portion;

wherein the forging the dual alloy workpiece comprises using flow maps from forge modelling to create the non-linear interface.

10. The method of claim 9, wherein prior to forging, the method comprises:

obtaining a first alloy stock to form the inner portion of the dual alloy workpiece;

obtaining a second alloy stock to form the outer portion of the dual alloy workpiece;

wherein the second alloy stock is more creep resistant than the first alloy stock, the first alloy stock being more cold dwell resistant than the second alloy stock.

11. The method of claim 10, wherein prior to forging, the method comprises friction welding a radially outer conical surface of the inner portion to a complementary radially inner conical surface of the outer portion.

12. The method of claim 11, wherein deforming the conical weld line includes changing a metal grain structure of both the first alloy stock and the second alloy stock during a common forging operation.

13. The method of claim 12, wherein the forging comprises placing the first alloy stock and the second alloy stock in a die and then squeeze forming the first alloy stock and the second alloy stock together.

* * * * *